United States Patent
Carrithers et al.

(10) Patent No.: US 11,571,691 B2
(45) Date of Patent: Feb. 7, 2023

(54) PIPETTE-FILLABLE PRINTHEAD BODY

(71) Applicant: Funai Electric Co., Ltd., Osaka (JP)

(72) Inventors: Adam D. Carrithers, Lexington, KY (US); James D. Anderson, Jr., Lexington, KY (US); Michael A. Marra, III, Lexington, KY (US)

(73) Assignee: Funai Electric Co., Ltd.

( * ) Notice: Subject to any disclaimer, the term of this patent is extended or adjusted under 35 U.S.C. 154(b) by 239 days.

(21) Appl. No.: 17/152,842

(22) Filed: Jan. 20, 2021

(65) Prior Publication Data
US 2022/0226806 A1 Jul. 21, 2022

(51) Int. Cl.
*B01L 3/00* (2006.01)
*G01N 35/10* (2006.01)
*B01L 3/02* (2006.01)

(52) U.S. Cl.
CPC ..... *B01L 3/0268* (2013.01); *B01L 2300/0829* (2013.01)

(58) Field of Classification Search
CPC ........... B01L 3/0268; B01L 2300/0829; B01L 3/523; B01L 3/527; B01L 2200/021; B01L 2300/0858; B01L 2400/0433; B01L 2400/0442; G01N 2035/1041; G01N 1/312; G01N 35/1016; B41J 2/17513; B41J 2/17536; B41J 2/17553; B41J 2/17503
See application file for complete search history.

(56) References Cited

U.S. PATENT DOCUMENTS

| | | | |
|---|---|---|---|
| 6,260,961 B1 | 7/2001 | Seu et al. | |
| 7,775,649 B2 | 8/2010 | Silverbrook | |
| 8,057,030 B2 | 11/2011 | Hamano | |
| 8,397,740 B2 | 3/2013 | Price et al. | |
| 9,718,277 B2 | 8/2017 | Kudo et al. | |
| 9,868,290 B2 | 1/2018 | Matsuda et al. | |
| 9,895,692 B2 | 2/2018 | Battrell et al. | |
| 10,124,593 B2 | 11/2018 | Komplin et al. | |
| 10,343,409 B2 | 7/2019 | Higuchi et al. | |
| 10,384,458 B1 | 8/2019 | Anderson, Jr. et al. | |
| 2004/0095447 A1 | 5/2004 | Bailey et al. | |
| 2005/0185037 A1* | 8/2005 | Bailey | B41J 2/17513 347/86 |
| 2006/0001704 A1 | 1/2006 | Anderson et al. | |
| 2016/0347075 A1* | 12/2016 | Matsuda | B41J 29/13 |
| 2018/0117921 A1* | 5/2018 | Weaver | B41J 2/17513 |
| 2019/0083972 A1 | 3/2019 | Nielsen et al. | |
| 2019/0232668 A1 | 8/2019 | Suzuki et al. | |
| 2020/0021786 A1 | 1/2020 | Watanabe et al. | |

* cited by examiner

*Primary Examiner* — Jennifer Wecker
*Assistant Examiner* — Oyeleye Alexander Alabi
(74) *Attorney, Agent, or Firm* — Luedeka Neely Group, PC

(57) ABSTRACT

A unitary, molded fluid reservoir body to which a fluid ejection head substrate is attached. The unitary, molded fluid reservoir body includes one or more discrete fluid chambers therein. Each of the one or more fluid chambers have an open top, side walls, and sloped bottom walls attached to the side walls, wherein each of the one or more fluid chambers terminates in a fluid supply via, and wherein the sloped bottom walls have an angle ranging from about 6 to about 12 degrees relative to a plane orthogonal to the sidewalls. An ejection head support face is disposed opposite the open top for attachment of a single fluid ejection device to the ejection head support face for ejecting fluid provided from the one or more chambers through the one or more fluid supply vias.

20 Claims, 14 Drawing Sheets

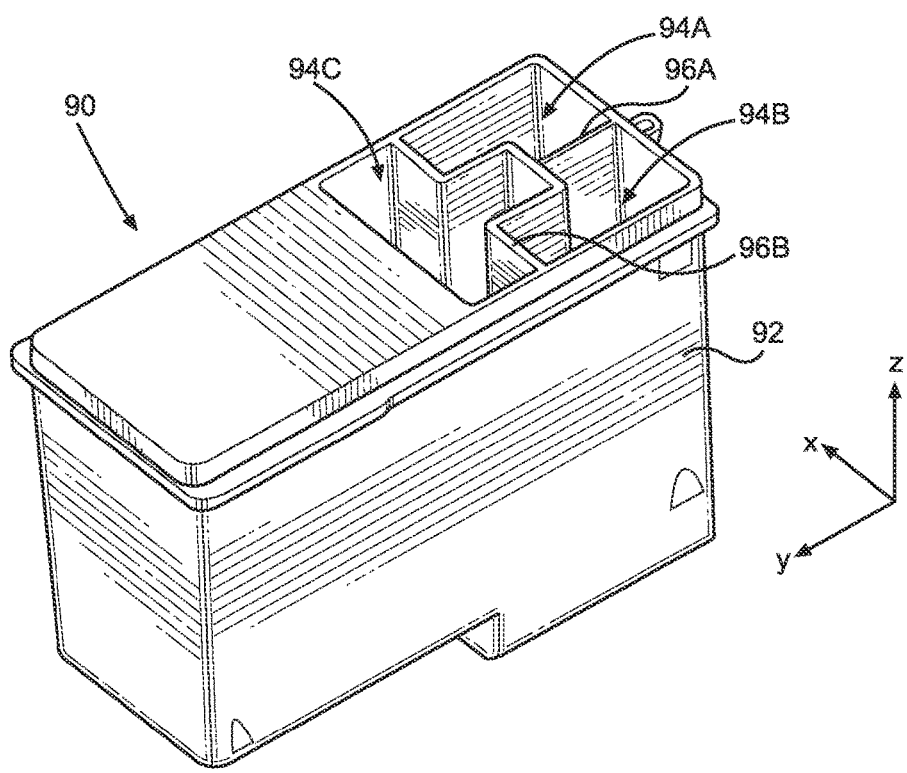
FIG. 7
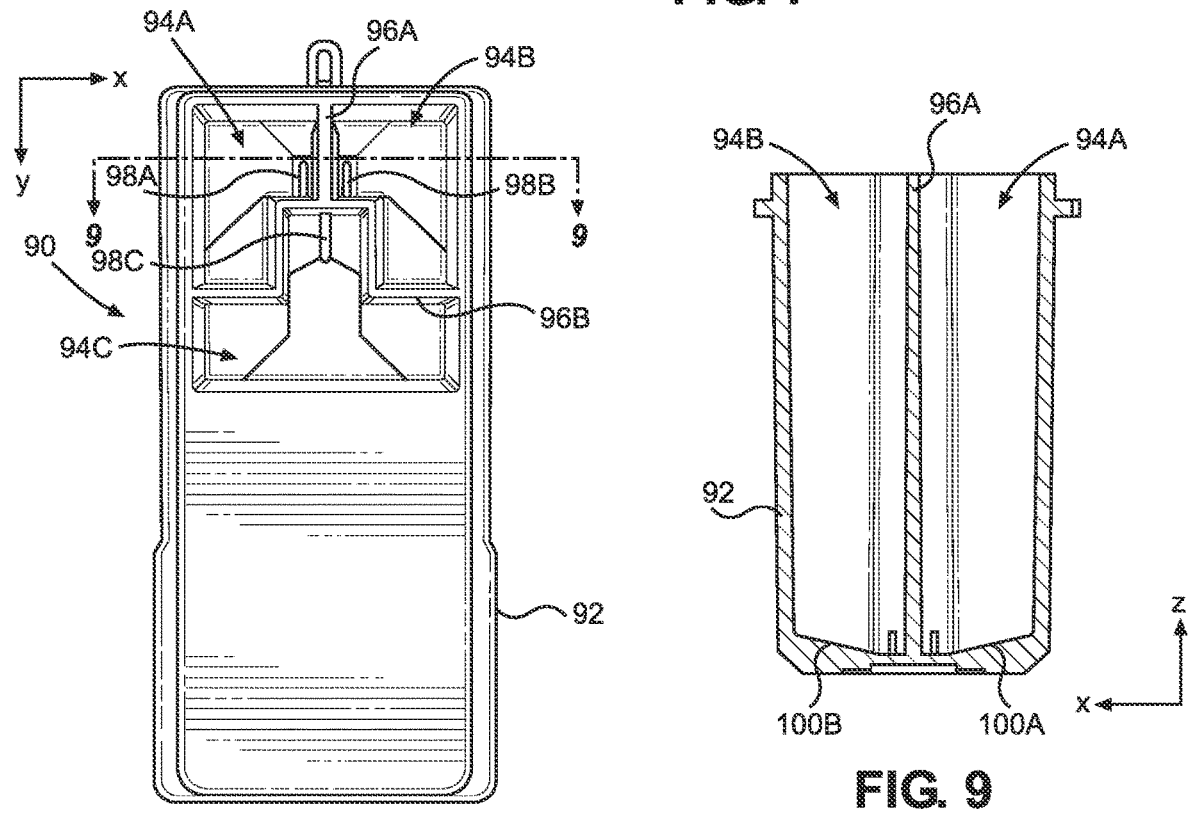
FIG. 8
FIG. 9

PIPETTE-FILLABLE PRINTHEAD BODY

TECHNICAL FIELD

The disclosure is directed to chemical or biological assays, such as drug screenings, and in particular to improved fluid reservoir bodies used for chemical and biological assay applications in inexpensive fluid deposition devices.

BACKGROUND AND SUMMARY

In the medical field, in particular, there is a need for automated sample preparation and analysis. The analysis may be colorimetric analysis or require the staining of samples to better observe the samples under a microscope. Such analysis may include drug sample analysis, blood sample analysis and the like. Assay analysis of blood, for example, provides a number of different factors that are used to determine the health of an individual. When there are a large number of patients that require blood sample analysis, the procedures may be extremely time consuming. For assay analysis, such as drug screenings, it is desirable to deposit miniscule amounts of target reagents to evaluate their effect and performance on the samples. Traditionally, pipettes—manually or electromechanically actuated—are used to deposit trace substances into these assay samples. The total volume of a test fluid produced for an assay is dictated by the ability to achieve a desired ratio of reagents with respect to the least of the reagents. Due to the small-scale volumetric limitations of pipettes, it is often necessary to create an excess of testing fluid to achieve the proper ratio of reagents.

It is well known that thermal inkjet technology is capable of precisely distributing picolitre-sized droplets of a jetting fluid. The precision and speed offered by inkjet technology makes it a promising candidate for increasing throughput of assay samples while decreasing the amount of wasted sample. In a conventional thermal-jet printer, a jetting fluid is typically prefilled into a printhead before reaching the end-user. However, it is impractical to use a prefilled cartridge in the life-sciences field where it is desirable to produce testing solutions on site.

While inkjet printing may be a viable method of administering chemical and biological assay analysis, inkjet printing products currently on the market use specialty printers and specially designed printheads which are cost prohibitive to some researchers. To reduce the cost of manufacturing and cost to the end-user, it is desirable to use pre-existing standard inkjet printers instead of specially designed printing systems. To enable the use of standard inkjet printers in the life science field, it is necessary to modify the printhead fluid reservoir bodies so that the pre-existing fluid reservoir form factors of the fluid reservoir bodies are maintained while allowing the fluid reservoir bodies to be easily filled with custom jetting fluids.

In view of the foregoing, an embodiment of the disclosure is a unitary, molded fluid reservoir body to which a fluid ejection head substrate is attached. The unitary, molded fluid reservoir body includes one or more discrete fluid chambers therein. Each of the one or more fluid chambers have an open top, side walls, and sloped bottom walls attached to the side walls. Each of the one or more fluid chambers terminates in a fluid supply via. The sloped bottom walls have an angle ranging from about 6 to about 12 degrees relative to a plane orthogonal to the sidewalls. An ejection head support face is disposed opposite the open top for attachment of a single fluid ejection device to the ejection head support face for ejecting fluid provided from the one or more chambers through the one or more fluid supply vias.

In some embodiments, the unitary, molded fluid reservoir body includes two fluid chambers therein, wherein the two fluid chambers are separated from one another by a dividing wall therebetween.

In some embodiments, the unitary, molded fluid reservoir body includes three fluid chambers therein, wherein the three fluid chambers are separated from one another by dividing walls therebetween.

In some embodiments, the unitary, molded fluid reservoir body includes four fluid chambers therein, wherein the four fluid chambers are separated from one another by dividing walls therebetween.

In some embodiments, the unitary, molded fluid reservoir body includes six fluid chambers therein, wherein the six fluid chambers are separated from one another by dividing walls therebetween.

In some embodiments, the fluid reservoir body includes a transparent molded fluid reservoir body. In other embodiments, the molded fluid reservoir body further includes indicia thereon for indicating various fluid fill volumes.

In some embodiments, the unitary, molded fluid reservoir body further includes a removable lid for closing the open top of the fluid chambers.

In some embodiments, the unitary, molded fluid reservoir body further includes a removable tape for covering the open top of the fluid chambers.

In some embodiments, each of the one or more discrete fluid chambers has a fluid volume ranging from about 200 microliters to about 1 milliliter.

In some embodiments, each of the one or more discrete fluid chambers further includes a shelf for indicating a fluid fill volume limit.

In some embodiments, prior to use, the one or more discrete fluid chambers are sealed with a protective tape. In other embodiments, the protective tape is a single-pull tape covering the open top and fluid ejection head.

In some embodiments, prior to use, the one or more discrete fluid chambers are covered with a removable lid.

In some embodiments, the open top further includes air vent channels therein.

In some embodiments, at least one of the sidewalls is undercut adjacent to the fluid supply via at an angle relative to a plane defined by the sidewalls wherein the angle ranges from about 8 to about 12 degrees.

In some embodiments, each of the one or more fluid chambers has a different maximum fluid volume. In other embodiments, each of the one or more fluid chambers has a similar maximum fluid volume.

In some embodiments, the fluid reservoir body comprises a translucent molded fluid reservoir body. In other embodiments, the molded fluid reservoir body includes indicia thereon in a transparent or translucent area of the molded fluid reservoir body for indicating a maximum fluid fill volume.

In some embodiments, there is provided a digital fluid dispense system that includes a unitary, molded fluid reservoir body to which a fluid ejection head substrate is attached. The unitary, molded fluid reservoir body includes one or more discrete fluid chambers therein. Each of the one or more fluid chambers have an open top, side walls, and sloped bottom walls attached to the side walls. Each of the one or more fluid chambers terminates in a fluid supply via. The sloped bottom walls have an angle ranging from about 6 to about 12 degrees relative to a plane orthogonal to the sidewalls. An ejection head support face is disposed opposite the open top for attachment of a fluid ejection device to the ejection head support face for ejecting fluid provided from the one or more chambers through the one or more fluid supply vias.

An advantage of the disclosed embodiments is that it provides unique low-cost cartridges for digitally dispensing fluids that can be used for a variety of fluid dispense applications and can be adapted to a wide variety of fluids to be dispensed. The cartridges also have the advantage of providing a single molded structure for one or more fluid reservoirs that is compatible with conventional inkjet type printers thereby eliminating costly multipart assembly steps.

Another advantage of the disclosed embodiments is that the cartridges do not require a lid to be sealed to the body of the cartridge. The fluid chambers and ejection nozzles can be sealed with an adhesive tape or label to prevent foreign matter from entering the chambers prior to use. The size of the chambers may be modified readily by minor modifications of the mold used to make the cartridges. Accordingly, the cartridges are easily customizable with regard to the fluid chamber volumes for different applications.

Unlike products that use a separate fluid ejection head chip for each fluid reservoir, a single fluid ejection head chip is attached to the body of the cartridge and is used for multiple fluid reservoirs. Using a single fluid ejection head chip improves the positional accuracy of the fluid droplets expelled from the ejection head.

BRIEF DESCRIPTION OF THE DRAWINGS

FIG. 7 is a perspective view, not to scale, of a fluid cartridge according to a third embodiment of the disclosure.

FIG. 8 is a top plan view, not to scale, of the fluid cartridge of FIG. 7.

FIG. 9 is an end cross-sectional view, not to scale of the fluid cartridge of FIG. 7 showing a view of fluid chambers therein.

DETAILED DESCRIPTION OF EXEMPLARY EMBODIMENTS

Figure 1:
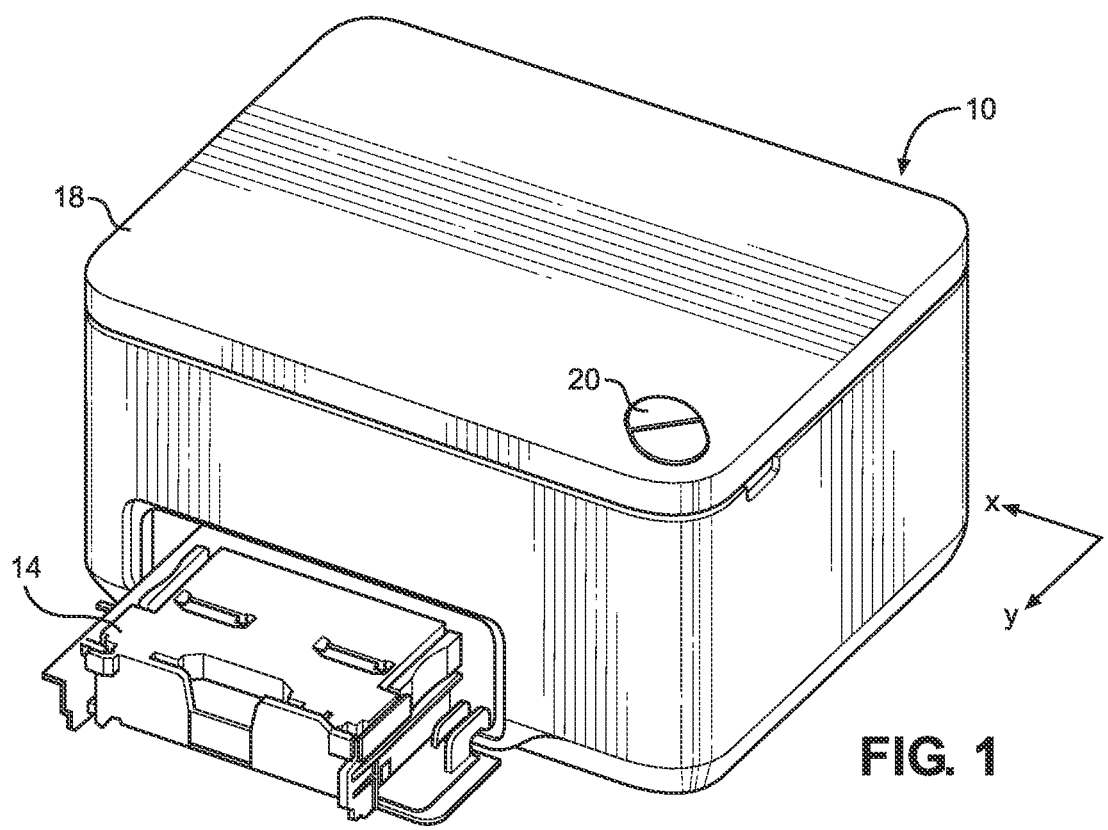
FIG. 1 is a perspective view, not to scale, of a digital dispense system according to an embodiment of the disclosure.
Figure 2:
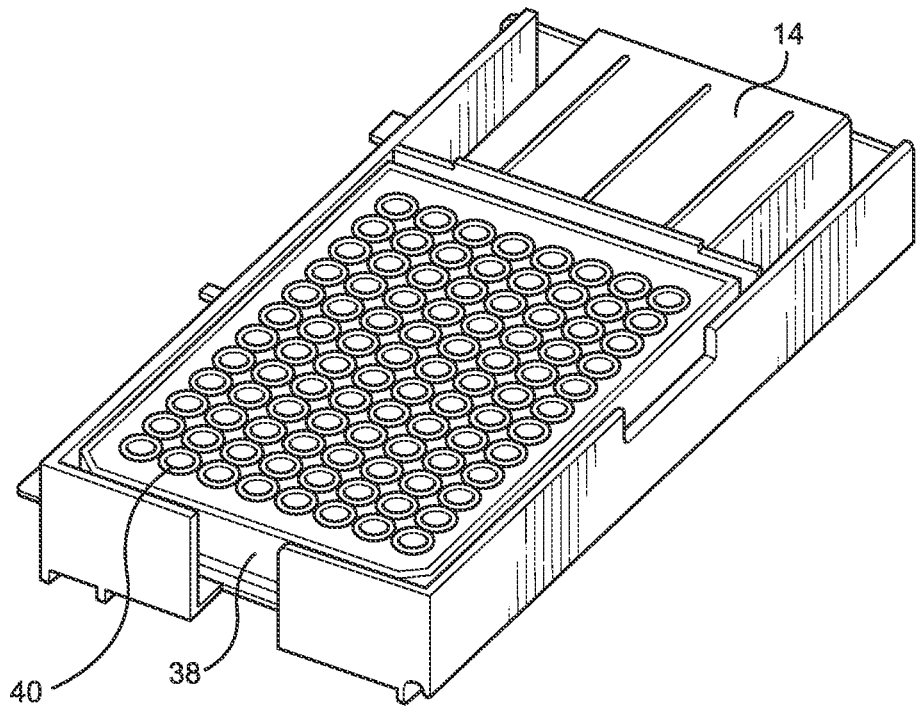
FIG. 2 is a perspective view, not to scale, of a tray and microwell plate for use with the digital dispense system of FIG. 1.

With reference to FIGS. 1-2 there is shown a digital dispense device 10 for accurately dispensing an amount of one or more fluids onto a substrate. Unlike the high-end digital dispense devices, the device 10 of the present invention is based on an ejection head that moves back and forth in a first x direction and a tray 14 for moving a substrate that moves back and forth in a second y direction orthogonal to the first direction during the fluid dispense operation. The disclosed device 10 can accept open and closed dispense heads rather than just open dispense heads. The tray 14 is adaptable to a wide variety of substrates including, but not limited to, micro-well plates, glass slides, electronic circuit boards and the like. FIG. 2 illustrates a tray 14 for holding a micro-well plate 38 containing wells 42 therein for use with the digital dispense device 10 to dispense fluid into the wells 42 of the micro-well plate or onto the glass slides. The tray 14 may include adapters for different size micro-well plates or for holding slides or other substrates for deposit of fluid thereon.

The dispense head cartridge containing a fluid ejection head and a cartridge movement mechanism are contained in a rectangular prism-shaped box 18. An activation switch 20 is included on the box 18 for activating the device 10. A rear side of the box 18 includes an opening for movement of the tray 14 through the box 18 in the second direction to dispense fluid onto a substrate. A USB port is provided on the box 18 to connect the digital dispense system 10 to a computer or a digital display device. Power is provided to the system 10 through a power input port on the box 18.

Figure 4:
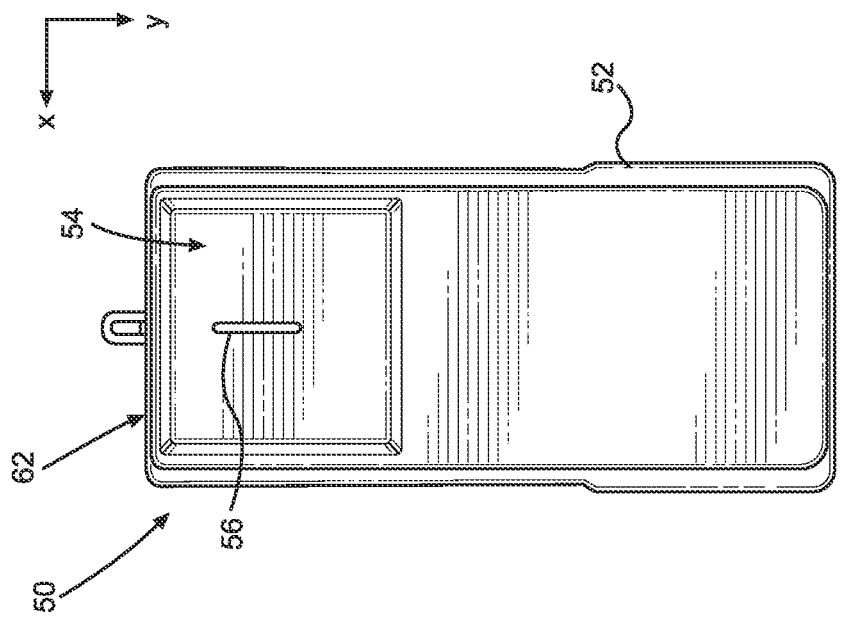
FIG. 4 is a top view, not to scale, of the fluid cartridge of FIG. 3.
Figure 3:
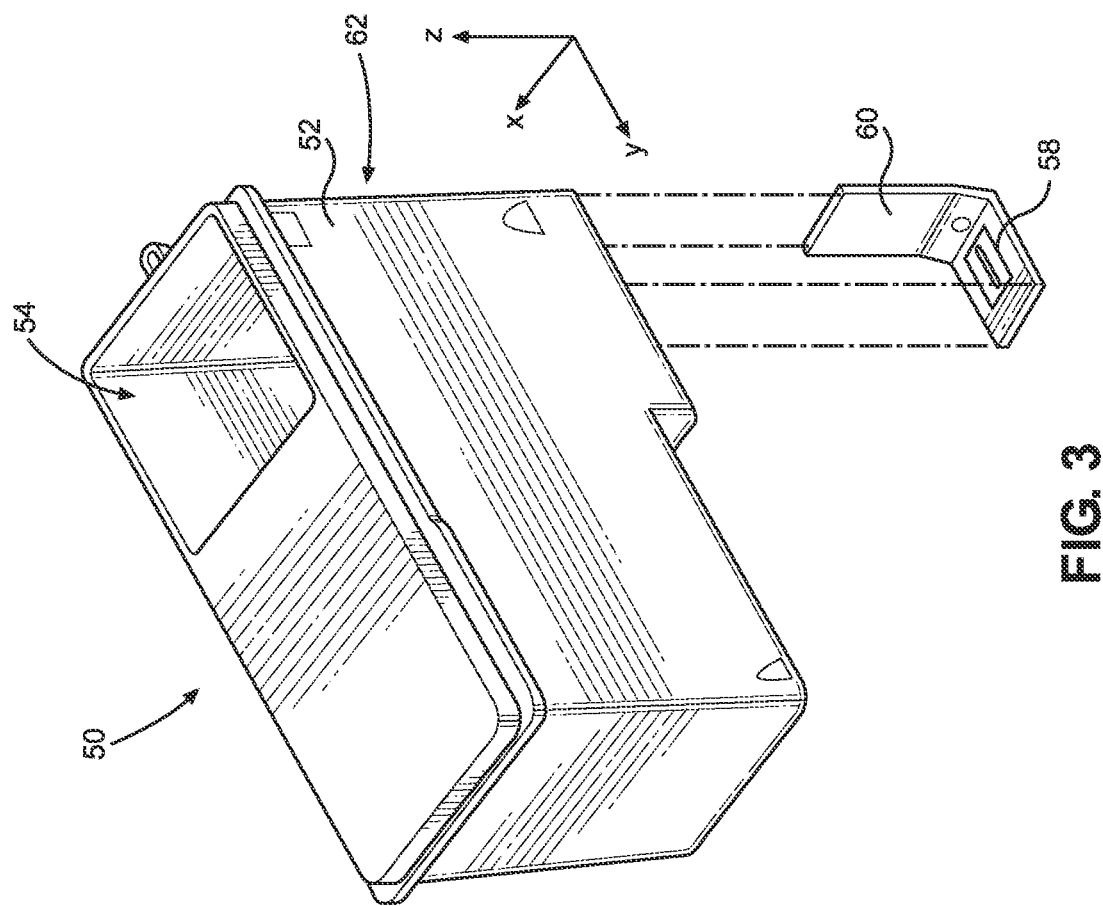
FIG. 3 is a perspective view, not to scale, of a fluid cartridge according to a first embodiment of the disclosure.

Fluid cartridges and components thereof for use with the digital dispense device 10 of FIG. 1 are illustrated in FIGS. 3-31. FIG. 3 is a perspective view, not to scale of a single chamber fluid droplet ejection cartridge 50 according to one embodiment of the disclosure. The cartridge 50 has a unitary molded body 52 that provides a single open fluid chamber 54 therein. The fluid chamber 54 has a fluid supply via 56 (FIG. 4) therein for flow of fluid from the chamber 54 to an ejection head chip 58 attached adjacent to the fluid supply via 56. From a practical point of view, each of the fluid chambers for the cartridges described herein may be filled with up to about 1 milliliter of fluid. As described in more detail below, the cartridges may contain indicia or structures to prevent overfilling of the fluid chambers. The ejection head chip 58 is electrically connected to a flexible circuit 60 that is attached to a front wall 62 of the unitary molded body 52. FIG. 4 is a top plan view of the single chamber cartridge 50 of FIG. 3 showing the position of a fluid supply via therein.

Figure 6:
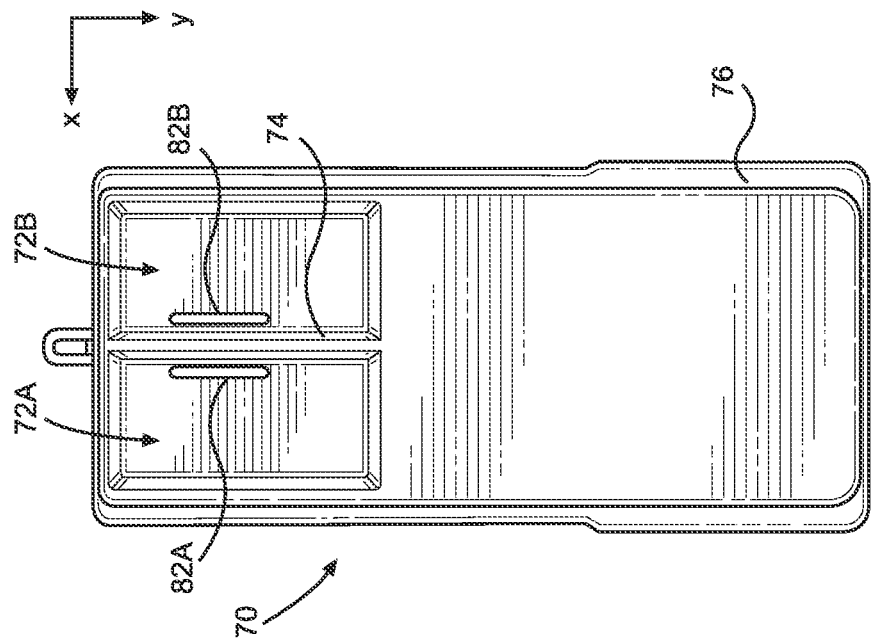
FIG. 6 is a top plan view, not to scale, of the fluid cartridge of FIG. 5.
Figure 5:
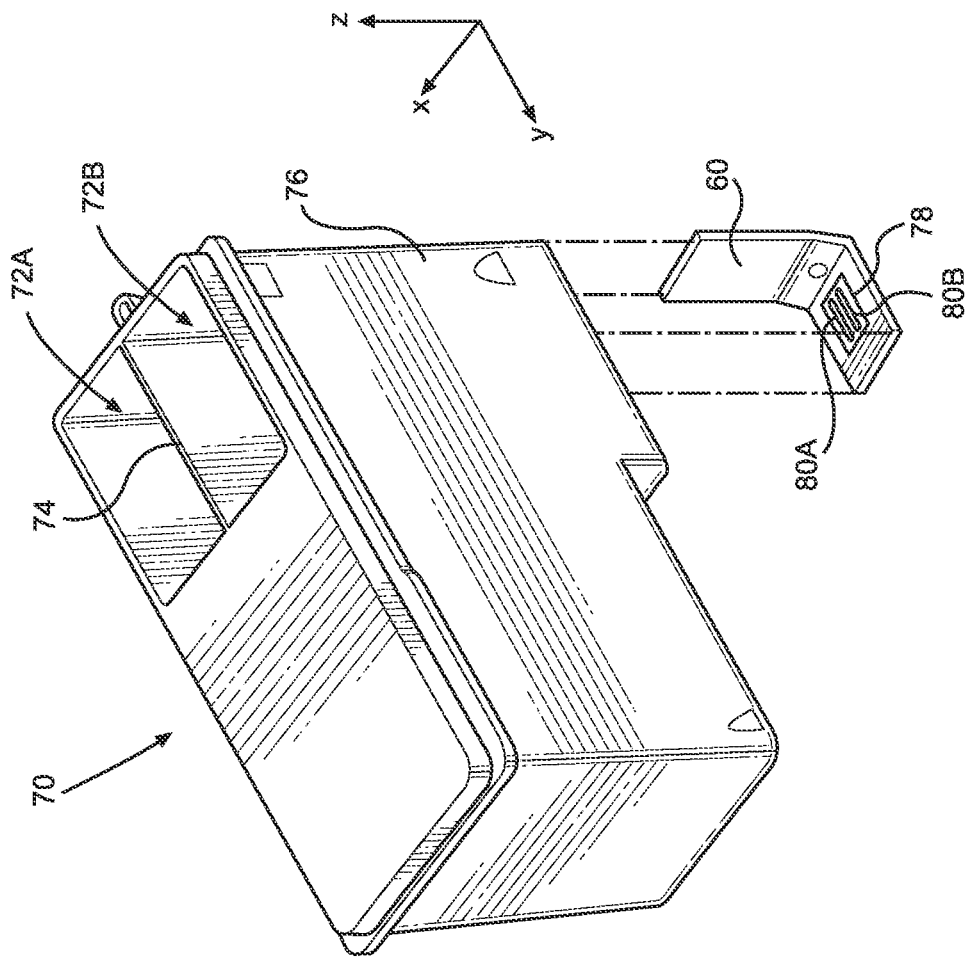
FIG. 5 is a perspective view, not to scale, of a fluid cartridge according to a second embodiment of the disclosure.

FIGS. 5 and 6 illustrate a fluid cartridge 70 have two open fluid chambers 72A and 72B therein. The fluid chambers 72A and 72B are separated from one another by a vertical dividing wall 74. The body 76 of the cartridge 70 is a similar unitary molded body to which an ejection head chip 78 containing two fluid ejector arrays 80A and 80B is attached. As shown in FIG. 6, the body 76 of the cartridge 70 is molded with two fluid supply vias 82A and 82B therein. Like the first embodiment, each of the open fluid chambers 72A and 72B of the fluid cartridge 70 may be filled with up to 1 milliliter of fluid, such as from about 200 microliters to about 1 milliliter.

FIGS. 7-9 illustrate a fluid cartridge 90 having a unitary body 92 with three open fluid chambers 94A, 94B and 94C therein. The chambers 94A-C are separated from one another by dividing walls 96A and 96B. The chambers 94A-C are illustrated with substantially the same fluid volume capacity in each chamber. However, the dividing walls 96A and 96B may be positioned to provide chambers having different fluid volumes. As in the previously described embodiments, the cartridge 90 includes three fluid supply vias 98A, 98B, and 98C for providing fluid to an ejection head chip containing three fluid ejector arrays. While the dividing walls 96A and 96B are substantially vertical dividing walls in the z direction, bottom walls of the chambers are sloped toward the fluid supply vias 98A-98C in the x and y directions. An illustration of the sloped bottom walls 100A and 100B of chambers 94A and 94B is illustrated in FIG. 9. In some embodiments, the bottom walls 100A and 100B have slope angles ranging from about 4 to about 20 degrees, such as from about 6 to about 12 degrees relative to planes in the x and y directions that are orthogonal to the dividing walls 96A and 96B.

Figure 11:
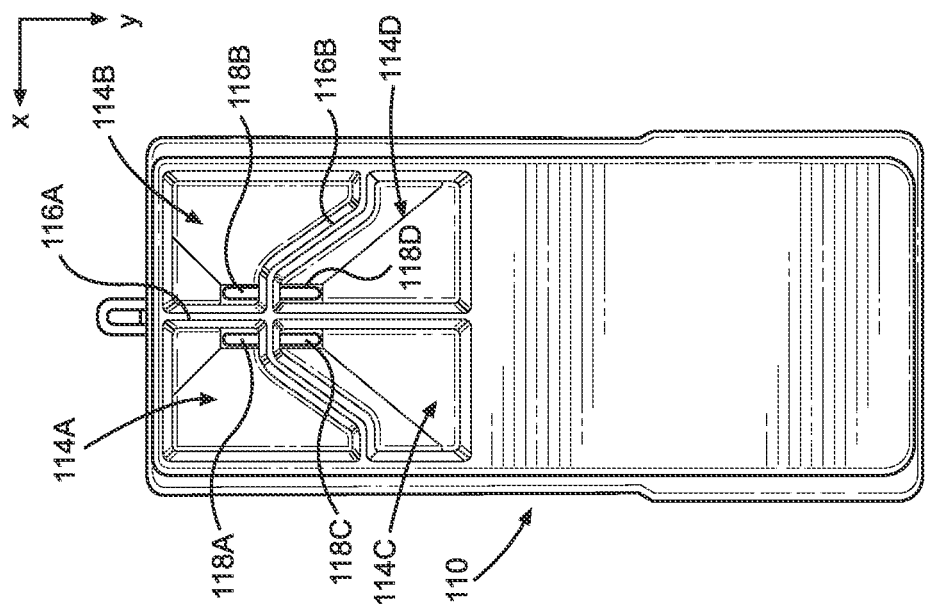
FIG. 11 is a top plan view, not to scale, of the fluid cartridge of FIG. 10.
Figure 10:
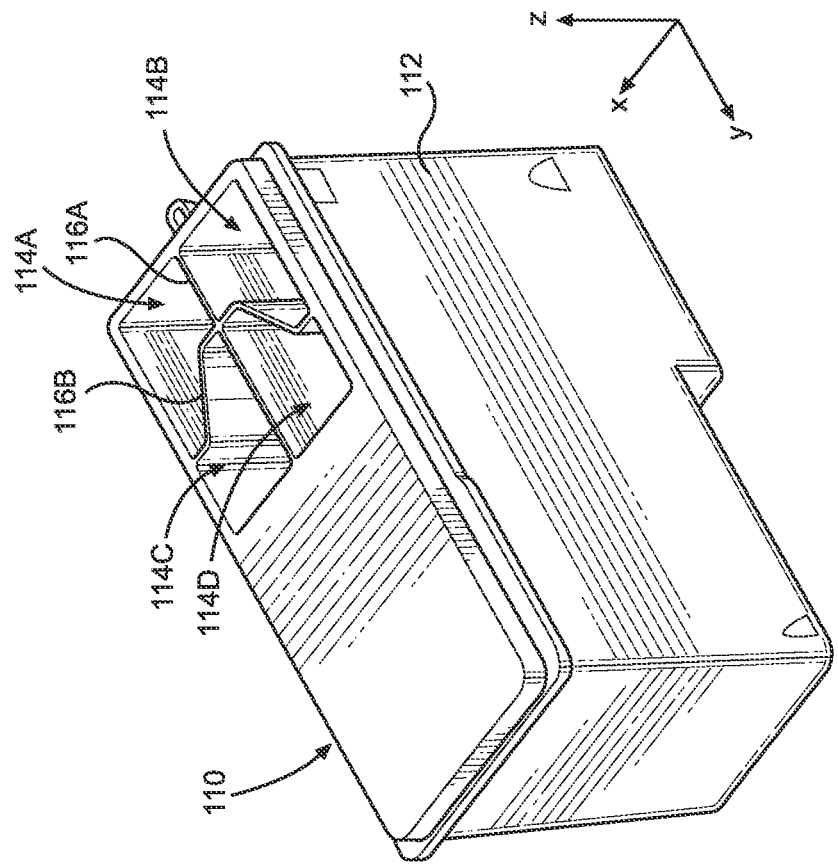
FIG. 10 is a perspective view, not to scale, of a fluid cartridge according to a fourth embodiment of the disclosure.

FIGS. 10-11 illustrate a fluid cartridge 110 having a unitary body 112 with four open fluid chambers 114A, 114B, 114C and 114D therein. Dividing walls 116A and 116B separate the chambers 114A-D from one another. As in the other embodiments, the chambers 114A-114D terminate in fluid supply vias 118A-118D. As in the previous embodiment, bottom walls of the fluid chambers 114A-114D are sloped toward the fluid supply vias 118A-118D.

Figure 13:
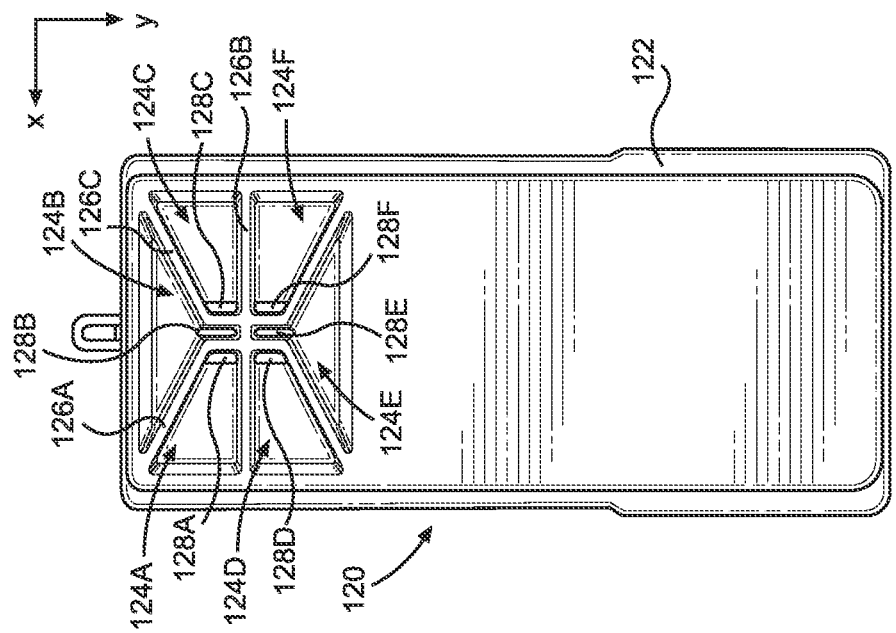
FIG. 13 is a top plan view, not to scale, of the fluid cartridge of FIG. 12.
Figure 12:
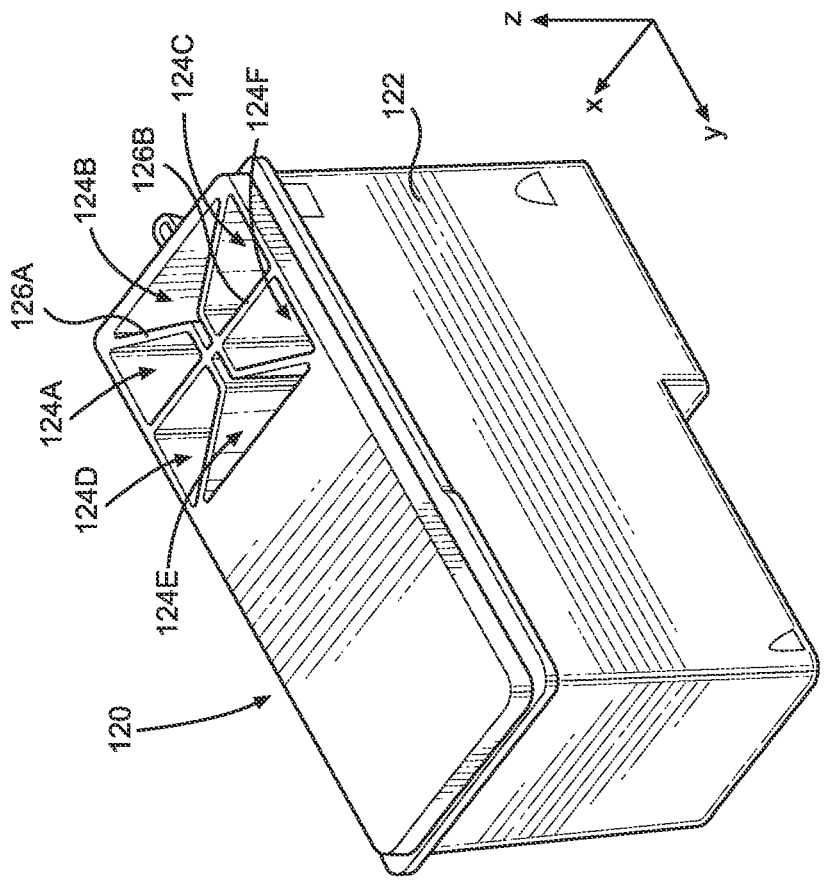
FIG. 12 is a perspective view, not to scale, of a fluid cartridge according to a fifth embodiment of the disclosure.

In still another embodiment, the fluid cartridge 120 has a unitary molded body 122 containing six open fluid chambers 124A-124F therein (FIG. 12). Dividing walls 126A, 126B and 126C separate the fluid chambers 124A-124F from one another. FIG. 13 illustrate the fluid chambers 124A-124F having sloped bottom walls terminating in fluid supply vias 128A-128F.

In the following description, reference is made to a fluid cartridge having four open chambers therein, as described above with reference to FIGS. 10 and 11. However, the features of the four chamber cartridge described below can also be applied to the cartridges described above containing one chamber, two chambers, three chambers, and six chambers. It is conceivable to provide a cartridge with five open-top chambers or more than six open-top chambers, but from a size and manufacturing point of view, the foregoing fluid cartridges provide the most practical configurations for the fluid cartridges used for dispensing fluids in the digital dispense device 10.

Figure 15:
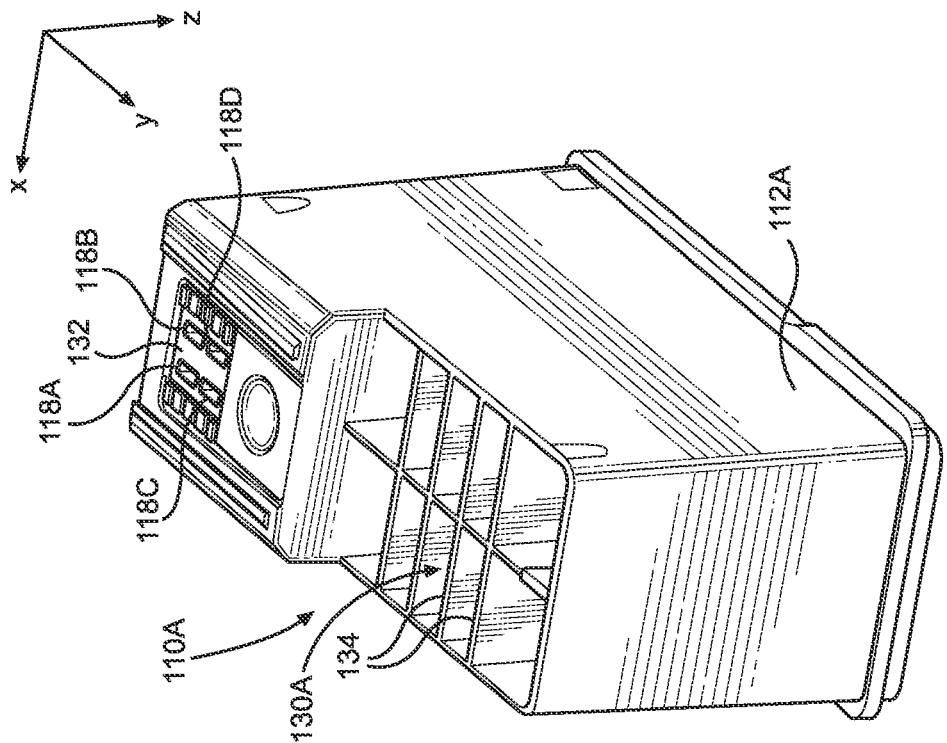
FIG. 15 is a bottom perspective view, not to scale, of an alternative fluid cartridge according to a sixth embodiment of the disclosure.
Figure 14:
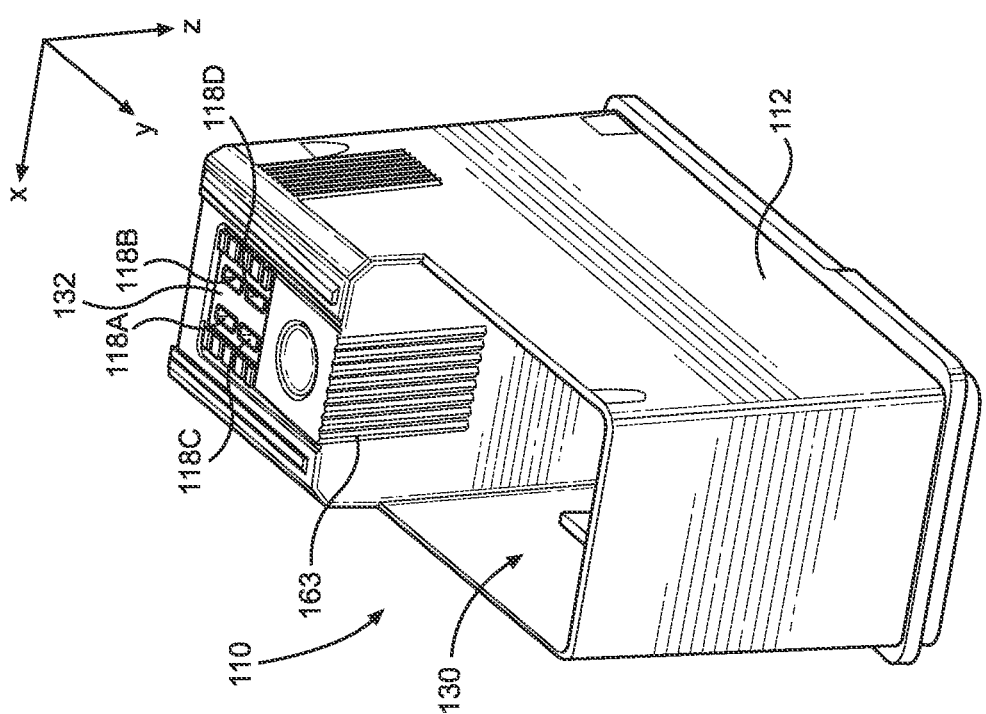
FIG. 14 is a bottom perspective view, not to scale, of the fluid cartridge of FIG. 10.

FIGS. 14 and 15 illustrate alternative constructions for the four chamber fluid cartridge described above. In a conventional inkjet cartridge, the area 130 would typically be filled with a backpressure control device such as a foam material and would have fluid flow channels leading to the fluid chambers. However, with the open-top chambers 114A-114D, fluid is inserted into the chambers at the time of use of the cartridge, so there is no need to store fluid in a foam filled area of the cartridge. Also, since the volume of fluid in each chamber 114A-114D is limited, there is no need for backpressure control devices or filter tower structures in the chambers 114A-114D thereby further reducing the complexity of the construction of the cartridge. FIG. 14 also shows a recessed area 132 for attaching the ejection head chip thereto.

In an alternative embodiment, as shown in FIG. 15, the cartridge 110A may include a plurality of ribs 134 in the area 130A to improve the structural integrity of the cartridge body 112A and to provide a landing area for removable tape described below.

Figure 17:
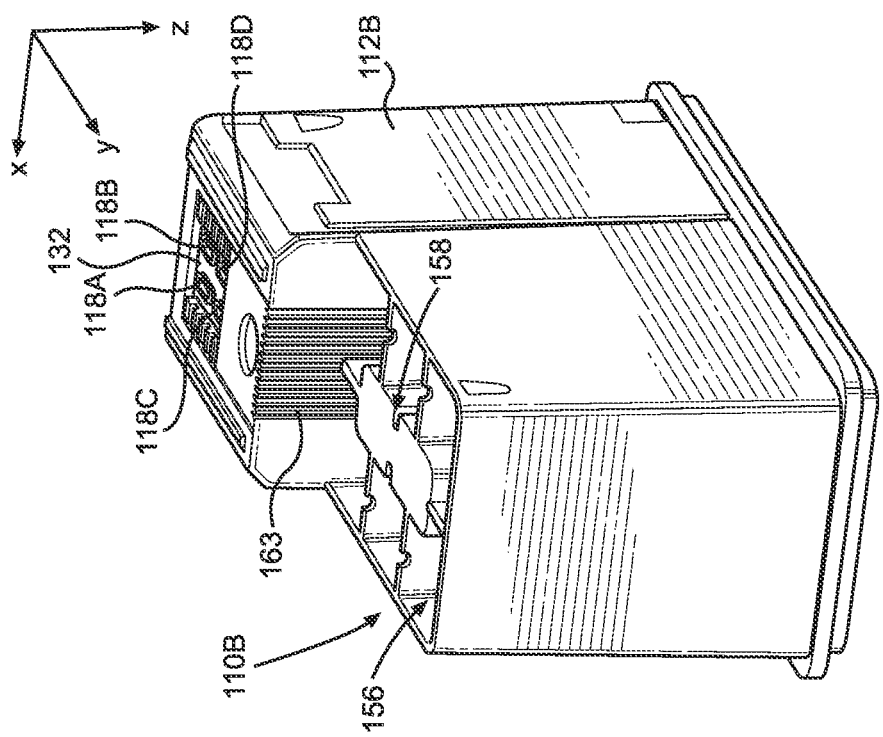
FIG. 17 is a bottom perspective view, not to scale, of the fluid cartridge of FIG. 16 according to the seventh embodiment of the disclosure.
Figure 16:
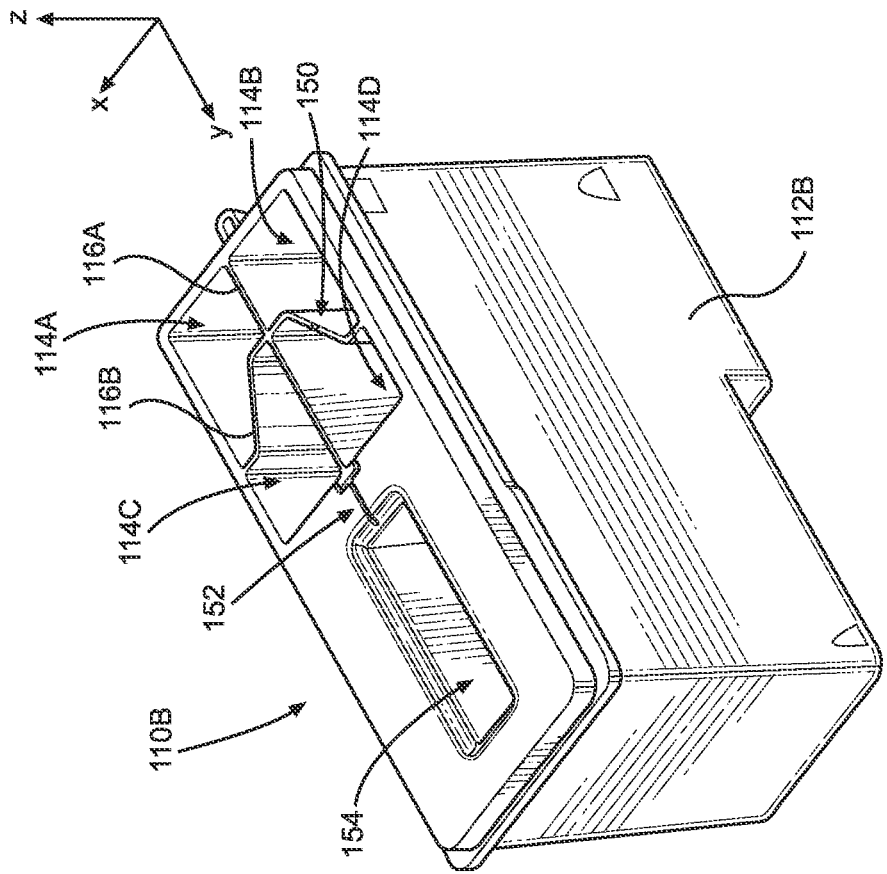
FIG. 16 is a top perspective view, not to scale, of an alternative fluid cartridge according to a seventh embodiment of the disclosure.
Figure 19:
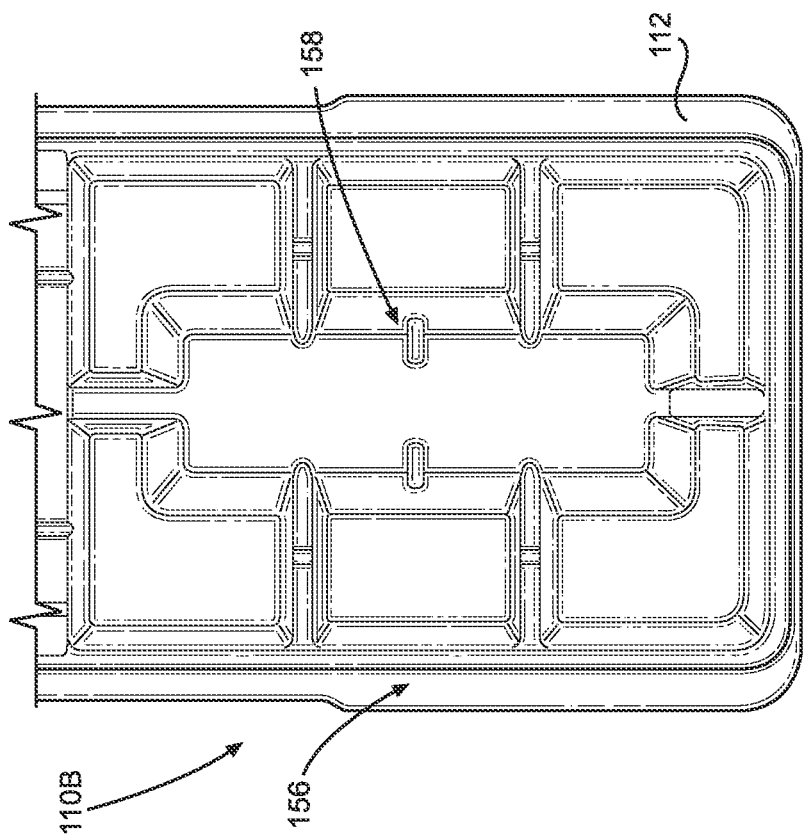
FIG. 19 is a partial bottom plan view, not to scale, of a portion of the fluid cartridge according to FIG. 16.
Figure 18:
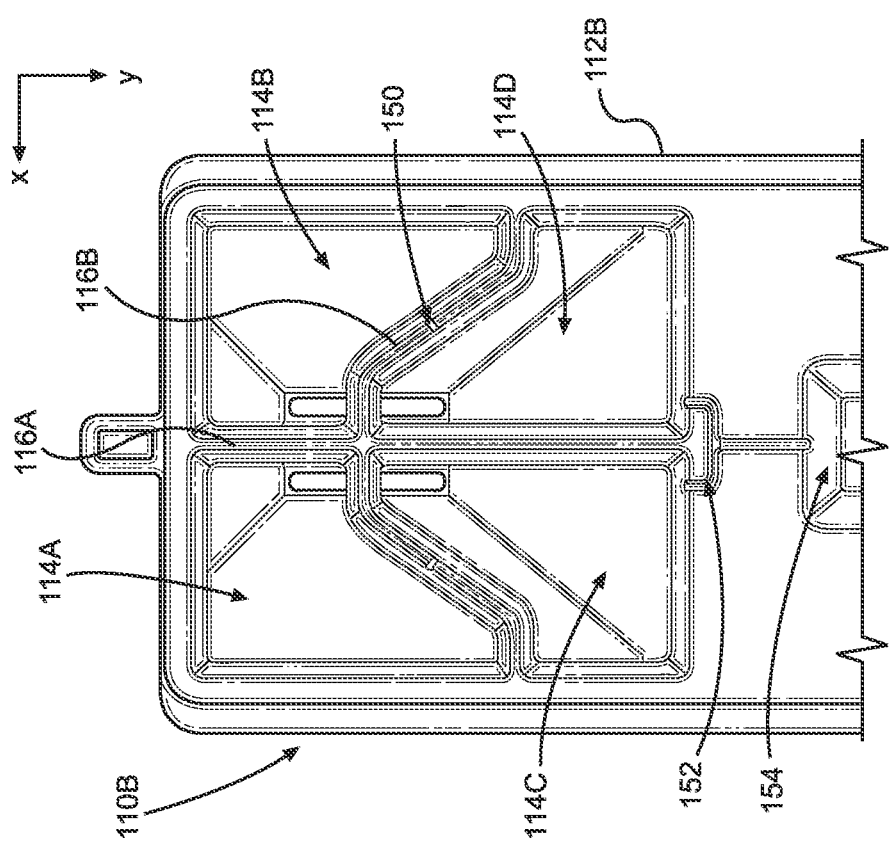
FIG. 18 is a partial top plan view, not to scale, of a portion of the fluid cartridge according to FIG. 16.
Figure 21:
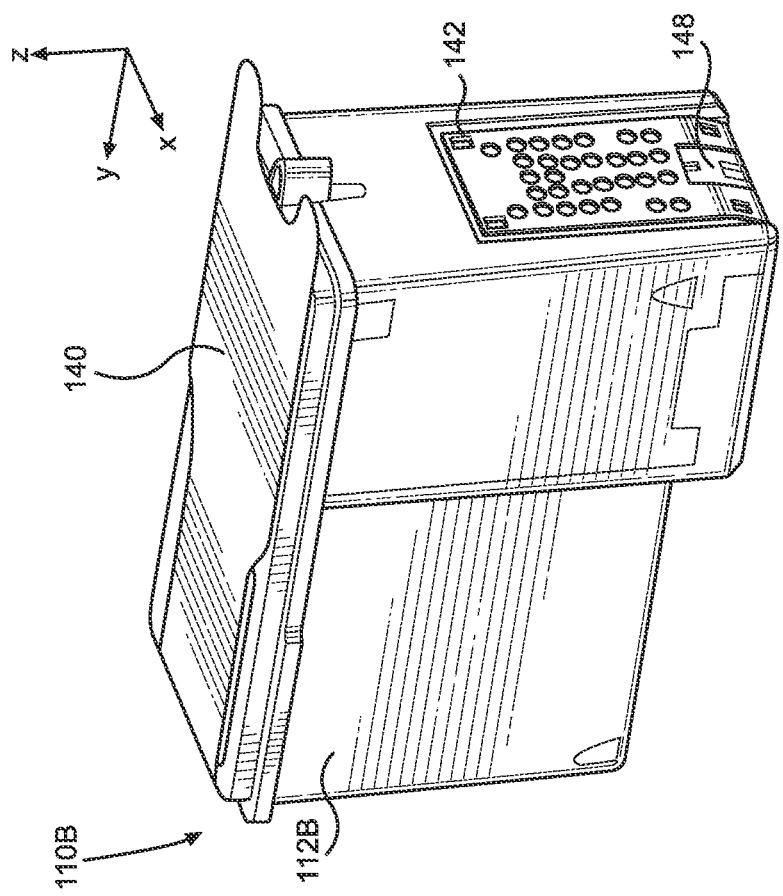
FIG. 21 is a top perspective view, not to scale, of the fluid cartridge of FIG. 16 illustrating the protective tape for the cartridge.

In some embodiments, it may be necessary to vent the chambers 114A-114D while storing the cartridge prior to use. In that case, air vents may be provided to vent the cartridge. FIG. 16 illustrates an alternative embodiment of a fluid cartridge 110B having air vent channels 150 in dividing wall 116B for fluid chambers 114A and 114B and air vent channel 152 for fluid chambers 114C and 114D. In order to provide a tortuous path for air from the chambers 114A-114D, an air cavity 154 may be provided for flow of air from the channels 150 and 152 to a bottom side 156 of the cartridge 110B (FIG. 17). Exhaust air vents 158 in gas flow communication with air cavity 154 are provided on the bottom side 156 of the cartridge 110B to provide the tortuous air flow path from the fluid chambers 114A-114D to the atmosphere. FIGS. 18 and 19 are partial close-up views of the top side (FIG. 18) and bottom side (FIG. 19) of cartridge 110B. In another embodiment, not shown, air channels may be extended to the top side edges of the cartridge 110A for air removal from the fluid chambers 114A-114D.

Figure 20:
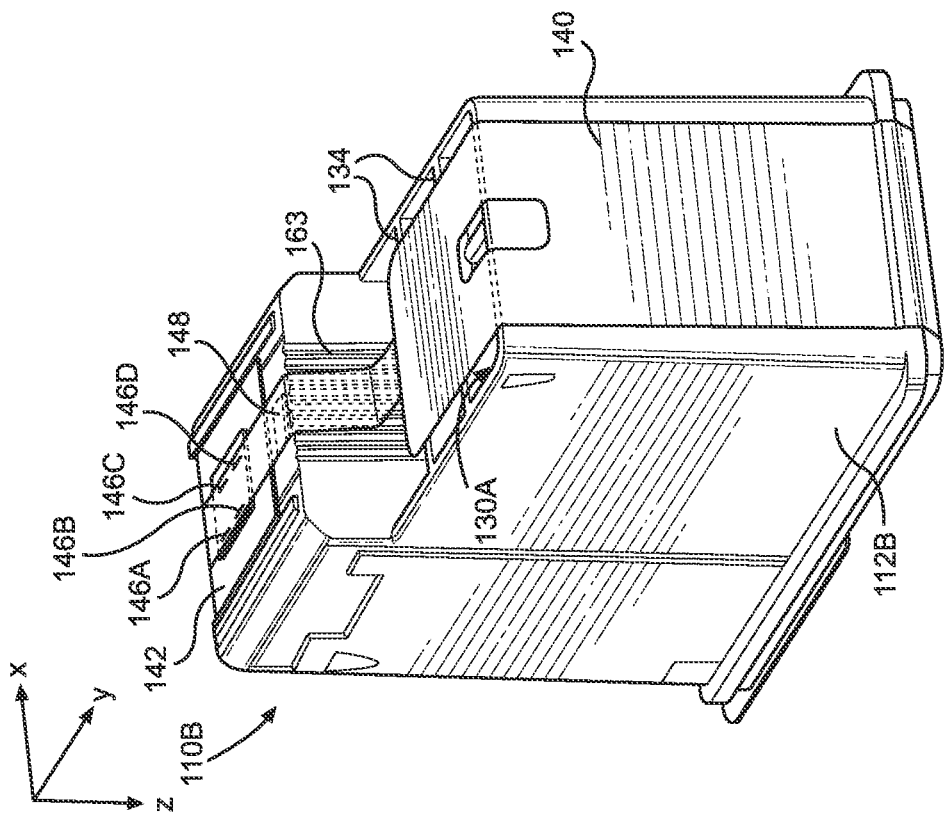
FIG. 20 is a bottom perspective view, not to scale, of the fluid cartridge of FIG. 16 illustrating a protective tape for the cartridge.

FIG. 20 also shows the flexible circuit 142 attached to an ejection head chip 144 disposed in the recessed area 132 (FIG. 17) of the cartridge 110B. In the four fluid chamber embodiment, the ejection head chip 144 includes 4 arrays 146A-146D of fluid ejectors corresponding to the four fluid supply vias 118A-118D in the cartridge body 112B. A removable tape 140 is attached to the cartridge body 112B to cover the open fluid chambers 114A-114D (FIG. 21) to protect the interior of the fluid chambers from dirt and debris. The tape 140 will remain on the cartridge until the cartridge is used. A blue tape 148 is attached to the removable tape 140 and covers the fluid ejectors 146A-146D prior to use of the cartridge to protect the fluid ejectors from dirt and debris. Removal of tape 140 also removes blue tape 148 from the cartridge 110B.

Figure 22:
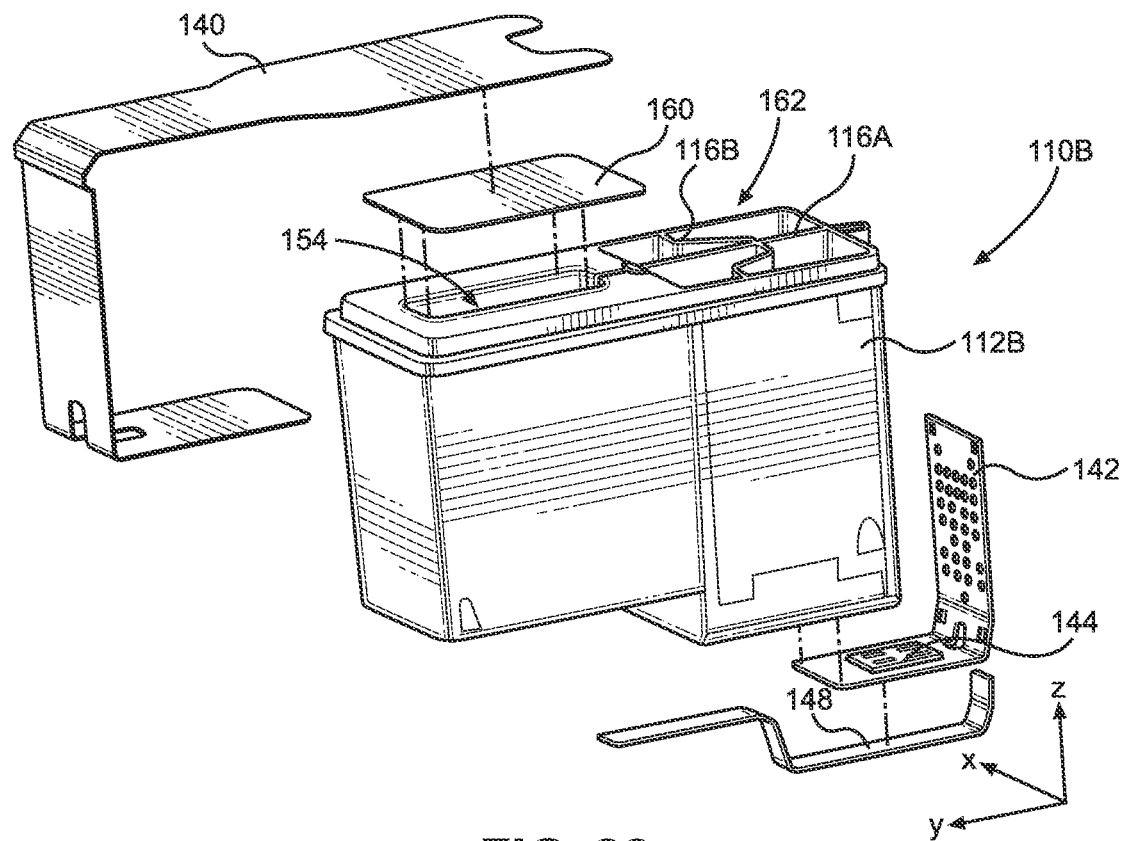
FIG. 22 is an exploded perspective view, not to scale, of the fluid cartridge of FIG. 18 and protective tapes for the fluid cartridge.

In some embodiments, a permanent label 160 may be applied to the top side 162 of the cartridge body 112B to cover the air cavity 154 as shown in FIG. 22. The permanent label 160 may include instructions or other identifying information about the cartridge 112B. In some embodiments, a single removable tape is used rather than removable tape 140 and blue tape 148 to cover both the chambers and the ejection head. Whether a single tape or multiple tape system is used, it is desirable to have a single pull tape to expose the fluid chambers and the ejection head. It is also desirable to provide grooves or release surfaces on the cartridge bodies described above to assist in tape removal from the cartridge bodies. To aid in removal of the removable blue tape 148 (FIG. 20), a plurality of ridges 163 are disposed on an exterior rear wall of the unitary molded body 112B.

Figure 23:
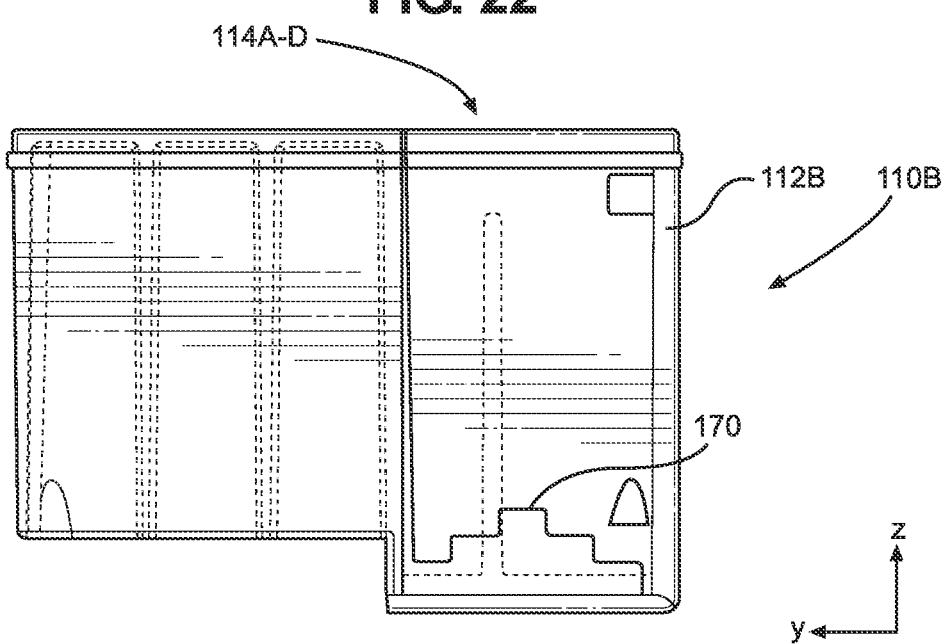
FIG. 23 is a side elevational view, not to scale of a fluid cartridge according to an eighth embodiment of the disclosure.

In some embodiments, the cartridge body 112B is molded from a clear plastic or polymeric material such as transparent nylon or polycarbonate so that the level of fluid in the fluid chambers 114A-114D can be seen by the user. In other embodiments, the cartridge body 112B is molded from a translucent plastic material. Accordingly, indicia 170 may be etched on the inside or outside of the cartridge body 112B adjacent to the fluid chambers 114A-114D to indicate the required or maximum level of fluid in each of the fluid chambers 114A-114D as shown in FIG. 23.

Figure 24:
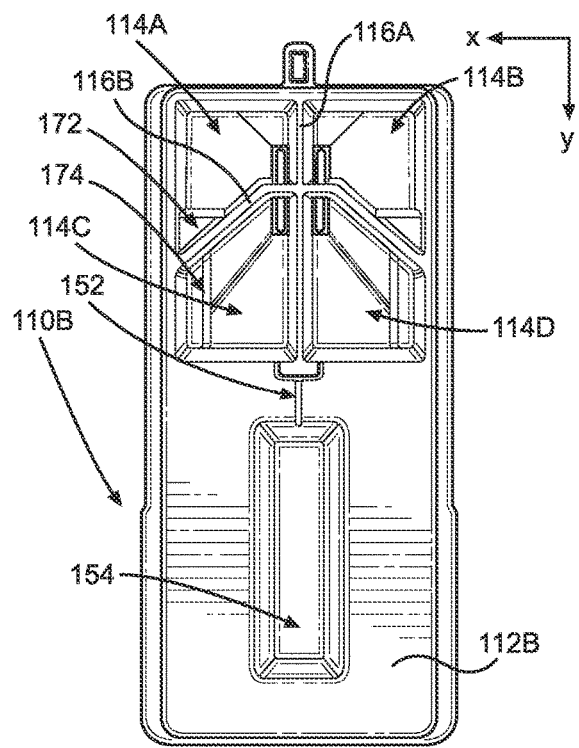
FIG. 24 is a top plan view, not to scale, of a fluid cartridge according to a ninth embodiment of the disclosure.
Figure 25:
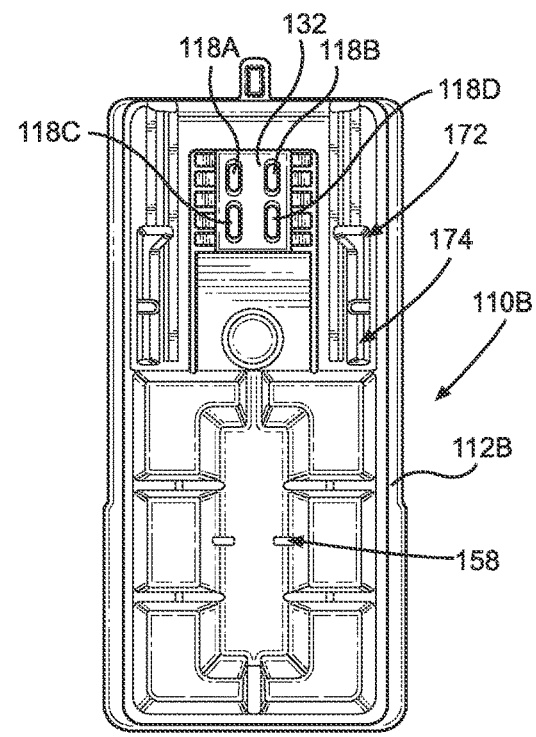
FIG. 25 is a bottom plan view, not to scale, of the fluid cartridge of FIG. 24.
Figure 26:
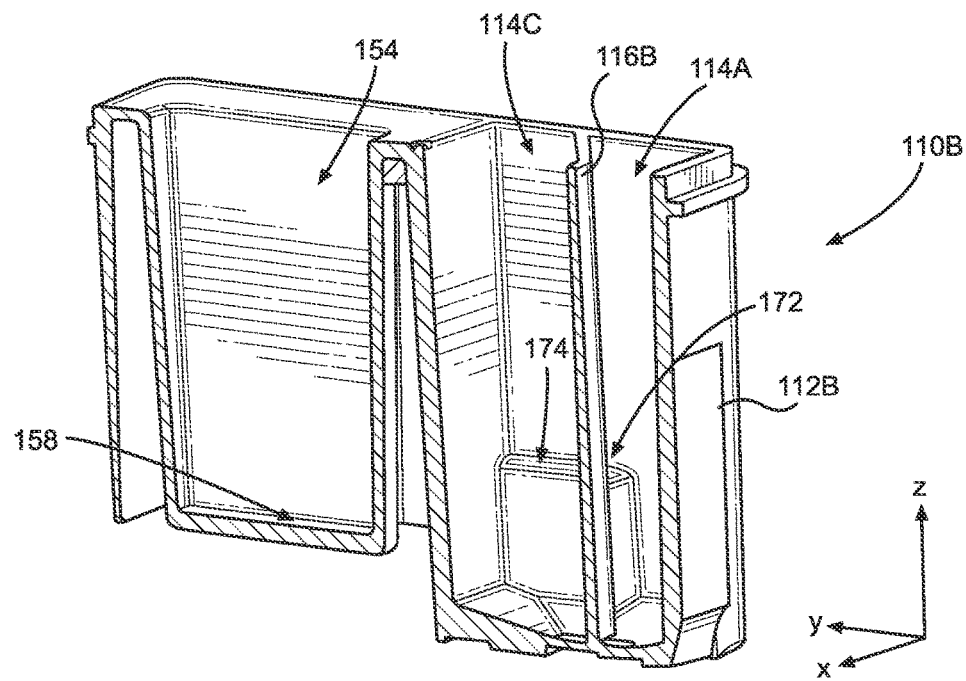
FIG. 26 is a perspective, cross-sectional view, not to scale, of the fluid cartridge of FIG. 24.
Figure 27:
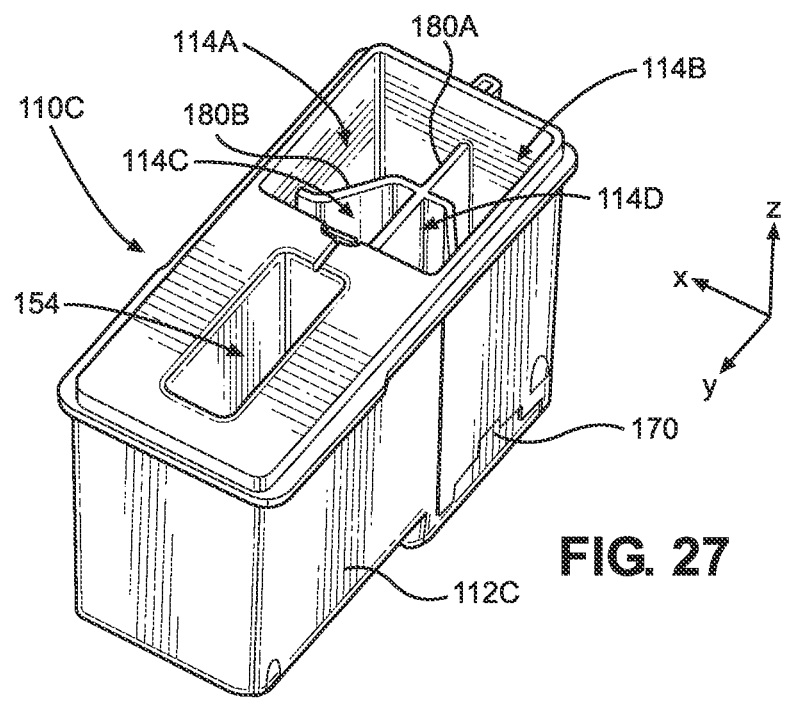
FIG. 27 is a top perspective view, not to scale, of an alternative fluid cartridge according to a tenth embodiment of the disclosure.

In other embodiments, the cartridge body 112B may be opaque and include protrusions or shelves 172 and 174 in the fluid chambers 114A-114D as shown in FIGS. 24-26. The shelves 172 and 174 not only provide a visual indication of how full to fill the chambers, but the shelves also provide areas on which the tip of a pipette may be dragged to break any adhesion of small amount of fluid from the pipette tip.

In some embodiments, dividing walls 180A and 180B (FIG. 27) may be used to prevent overfilling of the fluid chambers 114A-114D. In this embodiment, the dividing walls 180A and 180B do not extend to the top of the fluid cartridge 112C. The reduced height walls 180A and 180B may be used alone or in combination with the indicia 170 or the shelves 172 and 174 described above to limit the amount of fluid in the fluid chambers 114A-114D.

In embodiments wherein the cartridges contain four or six fluid supply vias and the corresponding ejection head chips contain four or six fluid ejector arrays, it may be desirable to closely space the fluid ejector arrays in order to reduce the size of the ejection head chips. However, closely spaced fluid ejector arrays also require that the fluid supply vias be closely spaced. The thickness of the dividing walls separating adjacent fluid chambers is dictated by the amount of material required for proper injection molding of the cartridges. Accordingly, the dividing walls between adjacent fluid supply vias may interfere with or partially overlap the fluid supply vias interfering with fluid flow to the ejection head chip and/or trapping air bubbles in the fluid supply vias.

Figure 28:
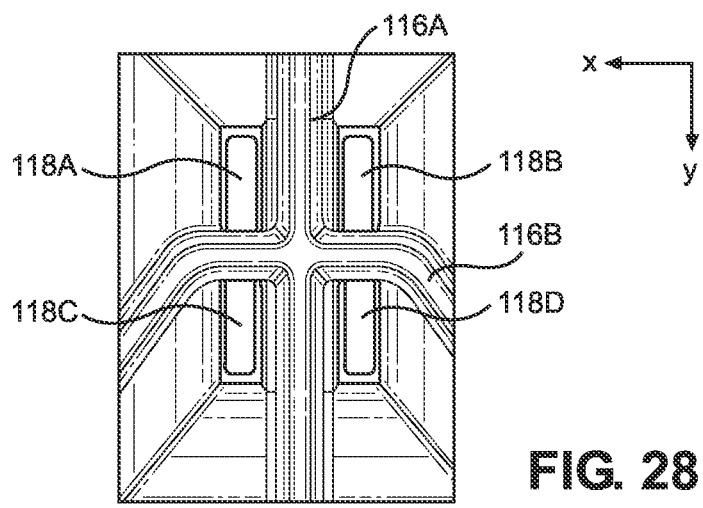
FIG. 28 is a partial plan view, not to scale of fluid supply vias in fluid chambers of the fluid cartridge of FIG. 10.
Figure 29:
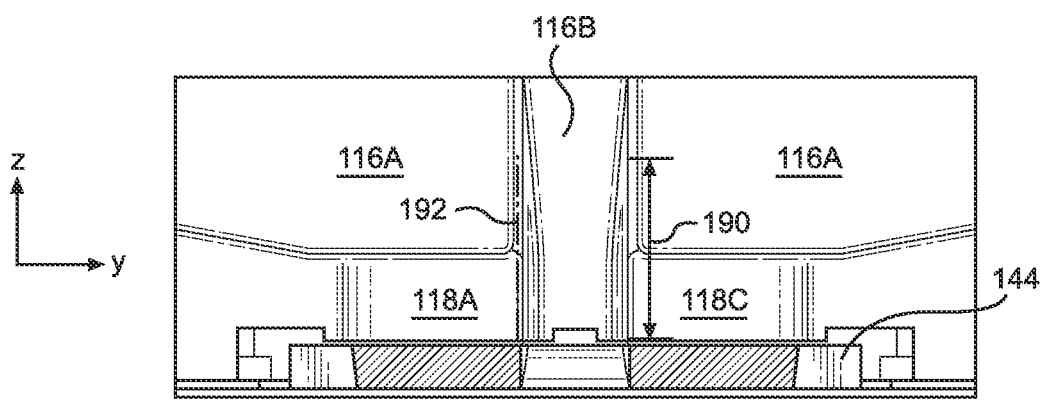
FIG. 29 is a partial, cross-sectional view, not to scale of two of the fluid supply vias of FIG. 28.
Figure 30:
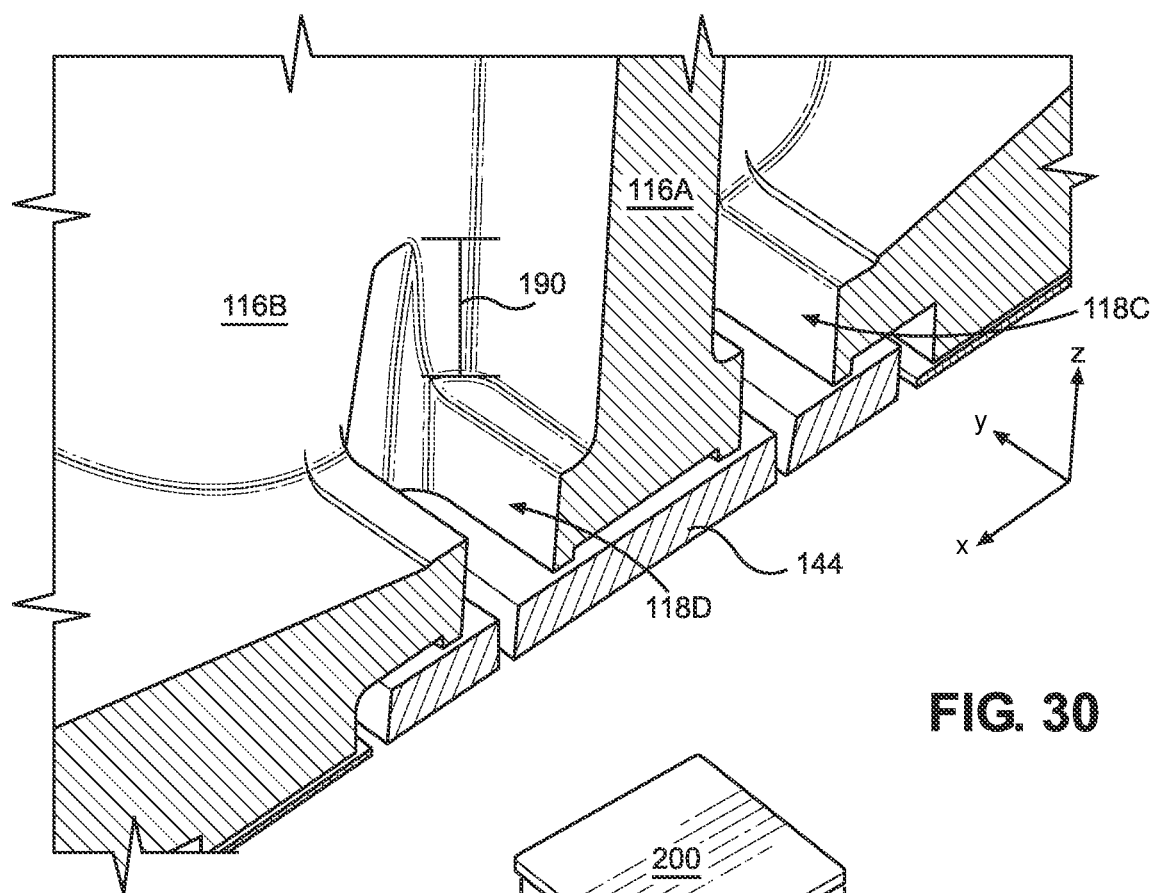
FIG. 30 is a partial, cross-sectional, perspective view, not to scale of a fluid supply via and dividing wall of FIG. 28.

Illustrations of closely adjacent fluid supply vias 118A and 118C are illustrated in FIGS. 28 and 29. The fluid supply vias 118A and 118C provide fluid to the ejection head chip 144. As can be seen, the dividing wall 116B is narrowed or undercut adjacent to the fluid supply vias 118A and 118C in the area 190, otherwise, the dividing wall 116B would partially overlap the fluid supply vias 118A and 118C as shown by the dotted line 192. Any overlap of the fluid supply vias 118A and 118C or 118B and 118D may cause air bubbles to be trapped under the overlapped portion of the dividing wall 116B represented by line 192. Accordingly, it is desirable to undercut the dividing wall 116B so that the portion 190 of the dividing wall adjacent to the fluid supply via is undercut at an angle relative to a plane in the z direction defined by the sidewall 116B. A suitable angle for the undercut area 190 relative to a plane in the z direction may range from about 6 to about 20 degrees, such as from about 8 to about 12 degrees. The undercut area 190 of wall 116B is further illustrated in the partial perspective view of FIG. 30 adjacent to fluid supply slot 118D.

By undercutting the walls 116B of the fluid supply cartridge, the fluid supply vias 118A-118C and 118B-118D may be spaced closer together in order to reduce the size of the ejection head chip 144. However, if it is desirable to use a larger ejection head chip 144, then the fluid supply vias 188A-118C and 118B-118D may be spaced further apart without undercutting the dividing wall 116B.

Figure 31:
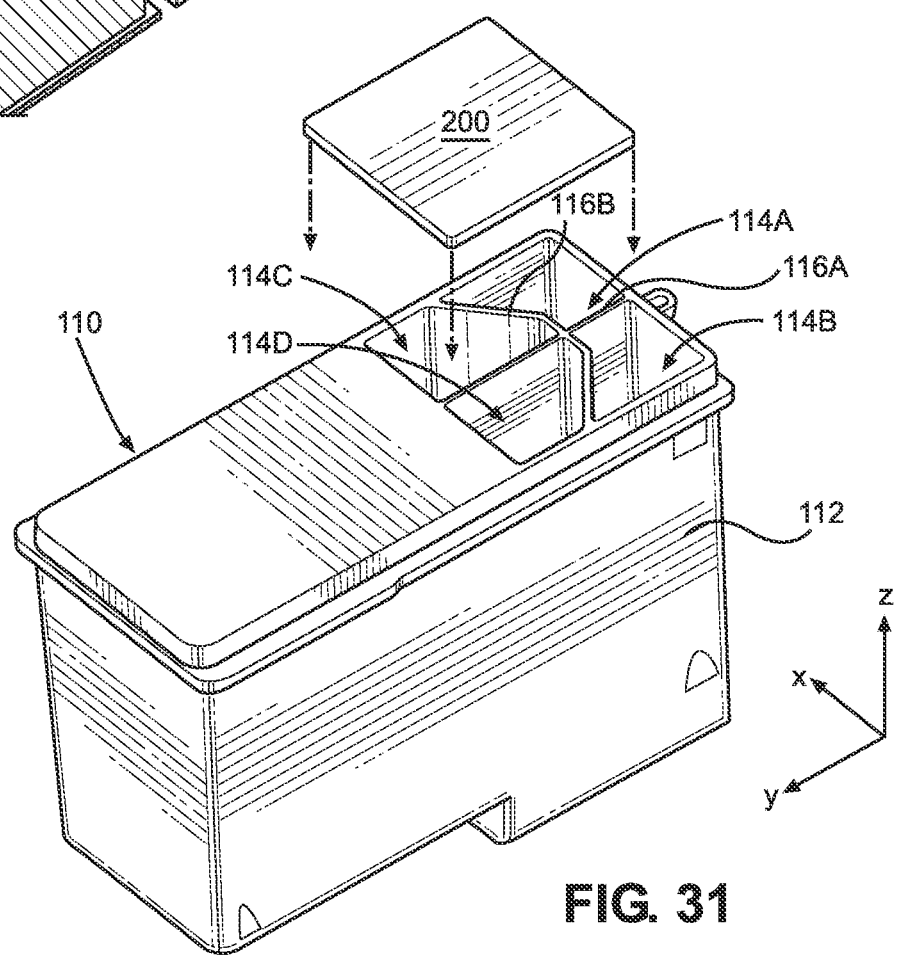
FIG. 31 is a perspective view, not to scale, of the fluid cartridge of FIG. 10 containing a removable lid.

In some embodiments, a removable lid 200 may be used to temporarily cover the fluid chambers 114A-114D as shown in FIG. 31. The removable lid 200 may be a snap-on or press-fit lid 200 that covers or exposes the fluid chambers 114A-114D.

In some embodiments, the digital dispense system 10 containing the open top cartridges described above may be used to deposit fluid into microwell plates. Filling of microwell plates for experimentation can be a time consuming manual task. It is desirable to be able to deposit fluid into multiple wells at the same time to decrease the time required to prepare the microwell plate. Conventional digital dispense systems exist, however the conventional systems have dispense heads arranged in a linear fashion along a single axis. The dispense head chips containing fluid ejectors are placed individually on such dispense heads. The present disclosure provides an improved fluid dispense system 10 by combining multiple arrays of fluid ejectors disposed in a two-dimensional matrix on a single ejection head chip 144. Such two-dimensional matrix enables the time to fill wells in the microwell plate to be significantly decreased. The two-dimensional matrix may also improve registration between the fluid ejectors and the microwell plate since the ejection head containing the two-dimensional array of fluid ejectors is formed through photolithography techniques rather than mechanical placing individual ejection heads onto an ejection head substrate.

A center-to-center distance between fluid via 118A and fluid via 118C may range from about 2 to about 9 mm, such as about 4.2 mm. The distance between fluid vias 118A and 118C or 118B and 118D may range from about 1 to about 5 mm, such as about 5 about 3.5 mm. In some embodiments, the ejection head chip 44 has a length L of about 7 to about 11 mm and a width W of about 5 to about 7 mm.

Accordingly, the digital dispense system 10 according to the disclosure can be used to deposit fluid into wells of a microwell plate, onto slides, onto circuit board substrates, or onto other substrates using the fluid cartridges described above. The ejection head chip 144 containing multiple arrays of fluid ejectors provides improved registration accuracy allowing for more precise filling of microwell plates, placement of droplets on a glass slide, or deposition of fluids on a circuit board substrate.

While the foregoing embodiments particularly described fluid cartridges having one to six fluid chambers, it will be appreciated that each fluid cartridge may be configured to dispense a single fluid, or two or more different fluids.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A unitary, molded fluid reservoir body to which a fluid ejection head substrate is attached, the unitary, molded fluid reservoir body comprising:
   one or more discrete fluid chambers therein, wherein each of the one or more fluid chambers is devoid of a backpressure device and has an open top configured for fluid obtained from a fluid filled pipette, side walls, and sloped bottom walls attached to the side walls, each of the one or more fluid chambers terminating in a fluid supply via, wherein the sloped bottom walls have an angle ranging from about 6 to about 12 degrees relative to a plane orthogonal to the sidewalls;
   and an ejection head support face disposed opposite the open top for attachment of a single fluid ejection device to the ejection head support face for ejecting fluid provided from the one or more chambers through the one or more fluid supply vias.

2. The unitary, molded fluid reservoir body of claim 1, comprising two fluid chambers therein, wherein the two fluid chambers are separated from one another by a dividing wall therebetween.

3. The unitary, molded fluid reservoir body of claim 1, comprising three fluid chambers therein, wherein the three fluid chambers are separated from one another by dividing walls therebetween.

4. The unitary, molded fluid reservoir body of claim 1, comprising four fluid chambers therein, wherein the four fluid chambers are separated from one another by dividing walls therebetween.

5. The unitary, molded fluid reservoir body of claim 1, comprising six fluid chambers therein, wherein the six fluid chambers are separated from one another by dividing walls therebetween.

6. The unitary, molded fluid reservoir body of claim 1, wherein the fluid reservoir body comprises a transparent molded fluid reservoir body.

7. The unitary, molded fluid reservoir body of claim 6, wherein the molded fluid reservoir body further comprises indicia thereon for indicating a maximum fluid fill volume.

8. The unitary, molded fluid reservoir body of claim 1, further comprising a removable lid for closing the open top of one or more of the fluid chambers.

9. The unitary, molded fluid reservoir body of claim 1, further comprising a removable tape for covering the open top of the fluid chambers.

10. The unitary, molded fluid reservoir body of claim 1, wherein each of the one or more discrete fluid chambers has a fluid volume ranging from about 200 microliters to about 1 milliliter.

11. The unitary, molded fluid reservoir body of claim 1, wherein each of the one or more discrete fluid chambers further comprises a shelf for indicating a fluid fill volume limit.

12. The unitary, molded fluid reservoir body of claim 1, wherein prior to use, the one or more discrete fluid chambers are sealed with a removable protective tape.

13. The unitary, molded fluid reservoir body of claim 12, where the protective tape is a single-pull tape covering the open top and fluid ejection head substrate.

14. The unitary, molded fluid reservoir body of claim 1, wherein the open top further comprises air vent channels therein.

15. The unitary, molded fluid reservoir body of claim 1, wherein at least one of the sidewalls is undercut adjacent to the fluid supply via at an angle relative to a plane defined by the sidewalls, the angle ranging from about 8 to about 12 degrees.

16. The unitary, molded fluid reservoir body of claim 1, wherein each of the one or more fluid chambers has a different maximum fluid volume.

17. The unitary, molded fluid reservoir body of claim 1, wherein each of the one or more fluid chambers has a similar maximum fluid volume.

18. The unitary, molded fluid reservoir body of claim 1, wherein the fluid reservoir body comprises a translucent molded fluid reservoir body.

19. The unitary, molded fluid reservoir body of claim 18, wherein the molded fluid reservoir body further comprises indicia thereon in a area of the molded fluid reservoir body for indicating a maximum fluid fill volume.

20. A digital fluid dispense system comprising the unitary, molded fluid reservoir body of claim 1 for accurately dispensing fluid from the single fluid ejection device into wells of a micro-well plate or onto glass slides.

* * * * *